(12) United States Patent
Meier et al.

(10) Patent No.: US 10,703,164 B2
(45) Date of Patent: Jul. 7, 2020

(54) COMPRESSED AIR SUPPLY SYSTEM

(71) Applicant: WABCO Europe BVBA, Brussels (BE)

(72) Inventors: Joerg Meier, Hessisch Oldendorf (DE); Uwe Stabenow, Laatzen (DE); Christoph Stuenkel, Wunstorf (DE)

(73) Assignee: WABCO EUROPE BVBA, Brussels (BE)

( * ) Notice: Subject to any disclaimer, the term of this patent is extended or adjusted under 35 U.S.C. 154(b) by 121 days.

(21) Appl. No.: 16/081,922

(22) PCT Filed: Feb. 6, 2017

(86) PCT No.: PCT/EP2017/000156
§ 371 (c)(1),
(2) Date: Sep. 3, 2018

(87) PCT Pub. No.: WO2017/167427
PCT Pub. Date: Oct. 5, 2017

(65) Prior Publication Data
US 2019/0070921 A1 Mar. 7, 2019

(30) Foreign Application Priority Data
Mar. 30, 2016 (DE) .................. 10 2016 003 662

(51) Int. Cl.
*B60C 23/14* (2006.01)
*B60G 17/056* (2006.01)

(52) U.S. Cl.
CPC ....... *B60G 17/0565* (2013.01); *B60G 17/056* (2013.01); *B60G 2500/2021* (2013.01); *B60G 2500/30* (2013.01); *B60G 2500/302* (2013.01)

(58) Field of Classification Search
CPC .............. B60G 17/056; B60G 17/0565; B60G 2500/2021; B60G 2500/302; B60G 2500/30
(Continued)

(56) References Cited

U.S. PATENT DOCUMENTS 6,824,145 B2 * 11/2004 Behmenburg .......... B60C 23/10
152/416
7,097,166 B2 * 8/2006 Folchert ............. B60G 17/0523
267/64.28
(Continued)

FOREIGN PATENT DOCUMENTS

DE 10223405 B4 1/2007
DE 102009003472 A1 8/2010
(Continued)

*Primary Examiner* — Toan C To
(74) *Attorney, Agent, or Firm* — Leydig, Voit & Mayer, Ltd.

(57) ABSTRACT

A compressed-air feed system for operating a pneumatic system includes a compressed-air supply, a compressed-air connection to the pneumatic system, a ventilation connection to surroundings, and a pneumatic main line between the compressed-air supply and the compressed-air connection. The pneumatic main line has an air dryer and a regeneration throttle. The compressed-air feed system further includes a ventilation line between the pneumatic main line and the ventilation connection. The ventilation line has a ventilation valve and a ventilation throttle. The compressed-air feed system further includes a bypass line between the compressed-air connection and the air dryer. The bypass line has a bypass valve formed as a 2/2 directional valve configured to permit an air flow conducted via the air dryer, and bypassing the regeneration throttle, for filling and ventilating the pneumatic system.

18 Claims, 3 Drawing Sheets

(58) Field of Classification Search
USPC ....... 280/124.157, 124.158, 124.16, 124.161
See application file for complete search history.

(56) References Cited

U.S. PATENT DOCUMENTS

| | | |
|---|---|---|
| 2003/0047853 A1 | 3/2003 | Behmenburg |
| 2003/0218281 A1 | 11/2003 | Ocker et al. |
| 2004/0188970 A1* | 9/2004 | Matern ............... B60G 17/0155 280/124.16 |
| 2011/0316248 A1* | 12/2011 | Hein .................. B60G 17/0523 280/124.159 |
| 2013/0195682 A1* | 8/2013 | Becher ....................... F04B 7/02 417/53 |
| 2013/0255240 A1 | 10/2013 | Bergemann et al. |
| 2013/0255787 A1* | 10/2013 | Frank ................. B60G 17/0523 137/1 |
| 2013/0257007 A1* | 10/2013 | Frank ................. B60G 17/0523 280/124.161 |
| 2018/0304718 A1* | 10/2018 | Seto ................... B60G 17/0424 |
| 2019/0010937 A1* | 1/2019 | Bredbeck ............. F04B 27/005 |
| 2019/0061459 A1* | 2/2019 | Meier ................ B60G 17/0528 |
| 2019/0111753 A1* | 4/2019 | Reuter ............... B60G 17/0155 |

FOREIGN PATENT DOCUMENTS

| | | |
|---|---|---|
| DE | 102010054710 A1 | 6/2012 |
| DE | 102012005345 A1 | 6/2013 |
| DE | 102012006382 A1 | 10/2013 |
| DE | 102014012646 A1 | 2/2016 |
| WO | WO 0176898 A1 | 10/2001 |

\* cited by examiner

COMPRESSED AIR SUPPLY SYSTEM

CROSS REFERENCE TO RELATED APPLICATIONS

This application is a U.S. National Stage Application under 35 U.S.C. § 371 of International Application No. PCT/EP2017/000156 filed on Feb. 6, 2017, and claims benefit to German Patent Application No. DE 10 2016 003 662.1 filed on Mar. 30, 2016. The International Application was published in German on Oct. 5, 2017, as WO 2017/167427 A1 under PCT Article 21(2).

FIELD

The invention relates to a compressed-air feed system for operating a pneumatic system, in particular an air suspension system of a vehicle. The invention also relates to a pneumatic system having the compressed-air feed system, to a method for operating a compressed-air feed system and/or a pneumatic system, in particular an air suspension system of a vehicle, and to a device for the open-loop and/or closed-loop control of a compressed-air feed system and/or of a pneumatic system.

BACKGROUND

A compressed-air feed system is used in vehicles of all types, in particular for feeding compressed air to an air suspension system of a vehicle. Air suspension systems may also comprise ride-height control devices with which the distance between a vehicle axle and vehicle body can be adjusted. An air suspension system of a pneumatic system mentioned in the introduction comprises a number of air bellows which are pneumatically connected to a common line (gallery) which, with increasing filling, can raise the vehicle body and, with decreasing filling, can correspondingly lower said vehicle body. With increasing distance between the vehicle axle and vehicle body, or ground clearance, the spring travels become longer, and it is also possible for greater ground unevennesses to be travelled over without contact with the vehicle body occurring. Such systems are preferably used in off-road vehicles and sport utility vehicles (SUVs). In the case of SUVs in particular, in the case of very high-powered engines, it is desirable for the vehicle to be equipped, on the one hand, with a relatively small ground clearance for high speeds on roads, and to be equipped, on the other hand, with a relatively large ground clearance for off-road travel. It is furthermore desirable for a change in the ground clearance to be implemented as quickly as possible, which increases the demands with regard to speed, flexibility and reliability of a compressed-air feed system.

DE 102 23 405 B4 describes an air suspension system for a motor vehicle, having a compressor, having a dryer connected downstream of the compressor, having ride-height control valves by means of which individual air springs assigned to the vehicle wheels can be actuated, having a pressure line which connects the compressor to the air springs, having a ventilation line, having a section of the pressure line between dryer and ride-height control valves, in which section a throttle is arranged parallel to a check valve, and having a switching valve, which is arranged parallel to the pressure line section, such that the throttle has a variable flow cross section. By means of this variable flow cross section, which operates as a throttle, and an electromagnetic switching valve, the outflow speed of the air mass that is discharged via the ride-height control valves in the event of a lowering of the vehicle ride height can be adjusted.

SUMMARY

In an embodiment, the present invention provides a compressed-air feed system for operating a pneumatic system. The compressed-air feed system includes a compressed-air supply, a compressed-air connection to the pneumatic system, a ventilation connection to surroundings, and a pneumatic main line between the compressed-air supply and the compressed-air connection. The pneumatic main line has an air dryer and a regeneration throttle. The compressed-air feed system further includes a ventilation line between the pneumatic main line and the ventilation connection. The ventilation line has a ventilation valve and a ventilation throttle. The compressed-air feed system further includes a bypass line between the compressed-air connection and the air dryer. The bypass line has a bypass valve formed as a 2/2 directional valve configured to permit an air flow conducted via the air dryer, and bypassing the regeneration throttle, for filling and ventilating the pneumatic system.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
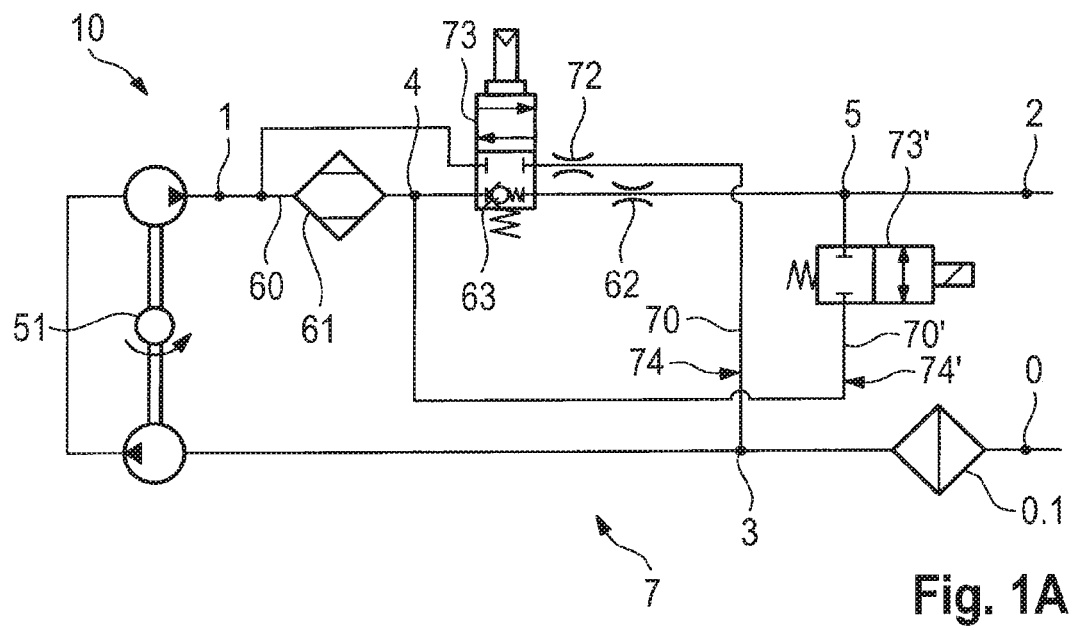
FIGS. 1A and 1B show a compressed-air feed system according to an embodiment of a first aspect of the invention, having a two-stage compressor, a 4/2 directional check valve as ventilation valve, and a 2/2 directional valve (FIG. 1A) or a 2/2 directional check valve (FIG. 1B) as bypass valve.

Embodiments of the invention provide improved solutions for compressed-air feed systems, which ensure an improved aeration and ventilation process, e.g., for a lowering of a vehicle. Embodiments of the invention further provide for an advantageous regeneration of an air dryer to be achieved.

According to a first aspect of the invention, a compressed-air feed system for operating a pneumatic system, in particular an air suspension system of a vehicle, is proposed, wherein the compressed-air feed system has: a compressed-air supply, a compressed-air connection to the pneumatic system, at least one ventilation connection to the surroundings, a pneumatic main line between the compressed-air supply and the compressed-air connection, which pneumatic main line has an air dryer and a regeneration throttle, a ventilation line between the pneumatic main line and a ventilation connection, which first ventilation line has a first ventilation valve and a ventilation throttle, a bypass line between the compressed-air connection and the air dryer, which bypass line has an additional bypass valve which is formed as a 2/2 directional valve and which permits an air flow conducted via the air dryer, and bypassing the regeneration throttle, for filling and ventilating the pneumatic system.

An advantage of the first aspect of the invention thus lies in the fact that an additional valve and a corresponding additional line are installed into the compressed-air feed system in order to ensure a fast ventilation and filling of the pneumatic system.

The filling and/or ventilation may be performed for as long as desired. Accordingly, in compressed-air feed systems according to embodiments of the invention, both a ventilation or filling cross section can be adjusted, that is to say a selection is made as regards whether the bypass line should be utilized, and a duration for said ventilation or filling process predefined.

Such an individual adjustment of the compressed-air feed system may be of interest for example if it is sought to control the compressed air within a vehicle without a delay. This may be relevant for an immediate lowering of a vehicle for the purposes of easy boarding, or for an asymmetrical lowering of a vehicle for show purposes.

A further advantage of compressed-air feed systems according to embodiments of the invention is that the air discharged for the purposes of ventilation is always conducted via the air dryer. In this way, an improved dryer regeneration can be achieved than is possible in the case of an air flow being discharged from the pneumatic system directly into the surroundings. A system for air drying is required in particular for a pneumatic system which exhibits high compressed-air consumption, such that generally humid air passes into the pneumatic system from the outside, which can lead to corrosion damage and corresponding malfunctions.

This is realized according to embodiments of the invention by means of the air dryer and the regeneration throttle. From the outside, humid air from the surroundings is, in part, used for filling the pneumatic system. Said air is compressed by the regeneration throttle and conducted through the air dryer to the compressed-air connection. Here, the moisture is absorbed by the air dryer in the high-pressure state. In a subsequent regeneration cycle, a part of this drawn-in, dried air is then expanded out of the pneumatic system through the regeneration throttle, is conducted again through the air dryer, and is discharged into the surroundings. Here, the dry air at the pressure lowered by the regeneration throttle then, by desorption, absorbs the moisture bound in the air dryer during the drying process again, and said air transports said moisture out of the system.

Compressed-air feed systems according to embodiments of the invention also have the advantage that the bypass valve can be operated in a virtually pressure-balanced state. In this way, a closing spring of the bypass valve, and a switching magnet that is typically utilized for switching said valve, can be designed to be small. Furthermore, a virtually pressure-balanced state ensures a substantially uniform loading of components of the compressed-air feed system.

It is furthermore advantageous that known compressed-air feed systems from the prior art can be easily converted to form a compressed-air feed system according to an embodiment of the invention. This requires merely an attachment of the bypass line and of the bypass valve parallel to the regeneration throttle.

The additional bypass valve can be utilized both for the purposes of ventilation and for the purposes of filling. This is realized in a particularly simple manner by means of the 2/2 directional valve that is used, because there is thus a blocking state of the valve and an unblocked state, which permits an exchange of compressed air in both directions by the valve.

In the context of embodiments of the invention, an operating mode refers inter alia to a setting of the valves of the compressed-air feed system, or a predefined sequence of positions of the valves. A further important manipulated variable of the pressure feed system for the definition of an operating mode may be an adjustable throttle width of the ventilation throttle.

According to a second aspect of the invention, a pneumatic system is provided having the compressed-air feed system according to the first aspect of the invention. The pneumatic system according to the second aspect of the invention furthermore has a pneumatic system formed as an air suspension system which has a gallery and at least one first branch line, which is pneumatically connected to the gallery and which has a bellows, and/or a second branch line, which is pneumatically connected to the gallery and which has a compressed-air reservoir, and having a first directional valve connected upstream of the bellows and/or a second directional valve connected upstream of the compressed-air reservoir.

A third aspect of the invention relates to a method for operating a pneumatic system, in particular an air suspension system of a vehicle, in particular by means of a compressed-air feed system according to the first aspect of the invention. The method according to the third aspect of the invention has the following steps: filling the pneumatic system by means of a compressed-air flow, conducted via a pneumatic main line and via an air dryer, from the compressed-air feed system via a main line valve, in particular a check valve, arranged in the pneumatic main line and/or via a bypass valve; maintaining the pressure in the pneumatic system, wherein the pneumatic main line is shut off, by means of the ventilation valve and the bypass valve, for prevention of a compressed-air flow out of the pneumatic system, and ventilating the pneumatic system by means of the compressed-air flow, conducted via the pneumatic main line and via the air dryer, from the pneumatic system via a ventilation valve connected to a ventilation throttle or via the ventilation valve and a bypass valve.

The method according to the third aspect of the invention has the same advantages as the compressed-air feed system according to the first aspect of the invention, because the compressed-air feed unit according to the first aspect leads to the method according to the third aspect.

According to a fourth aspect of the invention, a device is provided for the open-loop and/or closed-loop control of a compressed-air feed system and/or of a pneumatic system in accordance with a method according to the third aspect of the invention.

The device for the open-loop and/or closed-loop control of a compressed-air feed system and/or of a pneumatic system according to the fourth aspect of the invention has the same advantages as the compressed-air feed system according to the first aspect of the invention, because the compressed-air feed unit leads to the program according to the fourth aspect.

Here, the device for the open-loop and/or closed-loop control may be implemented in a computer which is situated in the vehicle in which the corresponding method for operating a pneumatic system is realized. Alternatively, the computer may be situated in an external unit, which, for example via a radio connection, actuates a compressed-air feed system which carries out the method for operating a pneumatic system. Here, the program is configured such that the computer that executes the program controls a position of the respective valves of the compressed-air feed unit and/or of the pneumatic system.

Preferred refinements of the compressed-air feed system according to the first aspect of the invention are described below.

In one refinement of the compressed-air feed system, the bypass line is connected via a first and a second connection point to the pneumatic main line, wherein the first connection point is arranged between the air dryer and the regeneration throttle, and the second connection point is arranged between the regeneration throttle and the compressed-air connection. Thus, in this refinement, the regeneration throttle is bypassed, whereas air flows for filling or ventilation are conducted via the dryer. By means of a compact structure of this refinement, which results from a parallel configuration of the bypass line, a pressure-balanced state is achieved in the compressed-air feed system particularly quickly after the commencement of a filling or ventilation process.

In a further refinement, the ventilation valve is a check valve and/or the additional bypass valve is formed as a further check valve. In this way, in this refinement, it is advantageously possible for a pressure which is too high for the functioning of the pressure feed system to be avoided within the pneumatic main line during a filling process. Here, in a particularly advantageous variant of this refinement, a spring force of a spring which closes the check valve is selected such that the check valve, in the absence of corresponding actuation, opens if a dynamic pressure upstream of the regeneration throttle lies close to a pressure value which is critical for the functioning of the compressed-air feed system. In this way, it is likewise possible to ensure a relatively fast filling of the pneumatic system by means of the compressed-air feed system. In another variant, through the use of a check valve, an abrupt ventilation sound that otherwise arises in the case of high pressures at the beginning of a suddenly started ventilation process is avoided. It is basically possible for the check valve to be unblocked in an expedient manner in accordance with demand. An unblocking line is preferably connected to the unblockable check valve. Said unblocking line may basically, in accordance with requirements, be an expediently designed control line, for example an electrical, magnetic or pneumatic control line, which is suitable for actuating the check valve such that the latter is unblocked.

Furthermore, in a further refinement, the compressed-air feed system permits a larger minimum flow cross section of a throughflowing compressed-air flow for the bypass line than for the regeneration throttle. In particular, the bypass valve has a larger nominal width than the regeneration throttle, which permits a particularly fast filling and ventilation of the pneumatic system for a respective operating mode with open bypass valve. The minimum flow cross section corresponds to the flow cross section at that component of a respective ventilation line which has the smallest nominal width. In this preferred refinement, the bypass line can be utilized for a faster ventilation than the pneumatic main line with the regeneration throttle. In a variant of this refinement, the minimum flow cross section of the bypass line is at least 1.5 times as large, preferably at least twice as large, preferably at least three times as large, as the minimum flow cross section of the regeneration throttle. In one variant of this refinement, the minimum flow cross sections of the regeneration throttle and of the bypass line are controllable. Thus, in addition to the control as regards which line is to be used, it is also possible for a flow cross section to be determined, whereby a rate of ventilation and filling of the pneumatic system can be controlled in finely graduated fashion in an effective manner. This is for example realized, in one variant, by means of a controllable regeneration throttle in the pneumatic main line and a controllable bypass throttle in the bypass line. The controllable regeneration throttle and the regeneration throttle may in this case be identical, in the same way as the bypass valve and the controllable bypass throttle.

In one refinement, the ventilation line permits a larger minimum flow cross section of a throughflowing compressed-air flow than the bypass line. This can advantageously reduce a possible backing-up of an air flow during a ventilation of the pneumatic system. In one advantageous variant of this refinement, the largest minimum flow cross section of the ventilation line is, in terms of area, of the same size as the sum of the minimum flow cross sections of the regeneration throttle and bypass line. In this variant, it is consequently possible for the filling and ventilation air flow to be conducted such that, with the bypass valve open and check valve in the pneumatic main line open, no backing-up of the air flow through the ventilation line occurs.

In a preferred refinement, the compressed-air feed system furthermore has a compressed-air reservoir, in particular additionally or alternatively as part of a pneumatic system which is connected via a filling valve to the pneumatic main line and which is designed to, in the presence of a boost mode of the compressed-air feed system, fill the pneumatic system with compressed air via the filling valve and the pneumatic main line. In the light of the present invention, this is particularly advantageous because, owing to the realization of a ventilation via the regeneration throttle in combination with the bypass line, a particularly fast ventilation is possible, such that a fast refilling of the pneumatic system may be desirable. Fast filling after a ventilation process may be necessary in order, in the event of a ventilation to below a desired air pressure level within the pneumatic system, to provide the desired air pressure level quickly. Furthermore, fast filling after a ventilation process may be necessary in order to restore a driving capability of the vehicle that has the pneumatic system, for example after a lowering of the vehicle or of one vehicle side in order to permit comfortable boarding of the vehicle. This refinement is particularly advantageous also because the filling via the bypass line and the pneumatic main line can take place quickly, such that a desired air pressure level within the pneumatic system can be realized particularly quickly by means of the compressed air from the compressed-air reservoir.

In one refinement, the compressed-air feed system has a two-stage compressor which is connected both to the air supply and to the pneumatic main line and which is designed to, in a corresponding operating mode of the compressed-air feed system, fill the pneumatic system with compressed air. Fast filling of the pneumatic system which is made possible in this refinement permits a fast correction of the air pressure level in the pneumatic system after the particularly fast ventilation process that can be realized by embodiments of the invention. In one variant of this refinement, the two-stage compressor is an alternative or in addition to the air pressure reservoir for the filling of the pneumatic system from the refinement from the previous section.

In one advantageous refinement of the compressed-air feed system, the pneumatic main line furthermore has a check valve. In this way, in an advantageous variant, compressed air can be held in the pneumatic system in a particularly simple manner.

In one refinement, the compressed-air feed system is designed to provide a first filling operating mode in which the bypass valve and the filling valve are at least temporarily simultaneously open, such that the pneumatic system can, over a predetermined time period of a filling process, preferably over an entire time period of the filling process, be filled by means of an air flow from the compressed-air reservoir, which flow is, in part, limited not by the regeneration throttle but by a minimum flow cross section of the bypass line. In one variant of this refinement, the bypass line has a minimum flow cross section of a throughflowing compressed-air flow at least 1.5 times as large as that of the regeneration throttle. In a further variant, the compressed-air feed unit is additionally designed to provide a second filling operating mode, in which the bypass valve is closed over an entire filling process. In this way, in this variant of the compressed-air feed unit, filling of the pneumatic system can be performed in the manner known from the prior art.

In a further refinement, the compressed-air feed system is designed to provide a first ventilation operating mode, in which only the ventilation valve and not the bypass valve is open, such that the pneumatic system can be ventilated exclusively over the entire time period of a ventilation process via the regeneration throttle. Consequently, in this refinement, in the second operating mode, a ventilation of the pneumatic system as known from the prior art can be performed.

In a particularly preferred refinement, the compressed-air feed system is designed to provide a second ventilation operating mode in which the ventilation valve and the bypass valve are simultaneously open, such that the pneumatic system can, over the entire time period of a ventilation process, be ventilated via the ventilation line by means of an air flow which is, in part, limited not by the regeneration throttle but by a minimum flow cross section of the bypass line.

In a particularly preferred refinement, for the execution of a ventilation process in the compressed-air feed system, a selection can be made between the first and the second ventilation operating mode. A selection of the operating mode is preferably performed in automated fashion in a manner dependent on a respective action of a user of the compressed-air feed system. For example, the opening of a door may lead to an activation of the first or second ventilation operating mode, in order that the vehicle can be quickly lowered for convenient boarding. The selection of the respective operating mode is, in a further variant of this refinement, performed by means of an external unit by means of which a user input that implies an operating mode can be received and transmitted.

In a further refinement, the second and/or another ventilation operating mode is provided such that the first ventilation valve is opened at a time t1 and that the bypass valve is opened at a time t2, and that the time t1 precedes the time t2. In this way, an abrupt ventilation sound can be ventilated by the ventilation valve, such that a switch can thereupon be made to a faster ventilation without an abrupt ventilation sound with the aid of the bypass valve.

In a further refinement of the compressed-air feed system, the second and/or another ventilation operating mode is provided such that the first ventilation valve is closed at a time t3 and that the bypass valve is closed at a time t4, and that the time t3 follows the time t4.

In a further preferred refinement, for the execution of a filling process in the compressed-air feed system, a selection can be made between the first and the second filling operating mode. A selection of the operating mode is preferably performed in automated fashion. For example, the closing of a door may lead to the activation of the first or second filling operating mode, in order that, after a lowering for boarding purposes, the vehicle can be quickly brought into a state in which it is ready for driving, with a corresponding air pressure level in the pneumatic system.

In one refinement of the compressed-air feed system, a check valve in the pneumatic main line is formed as a 4/2 directional valve, which controls a ventilation of the first ventilation line. This is advantageous because, in this way, a compact combination of check valve from the pneumatic main line and first ventilation valve from the first ventilation line is possible, as will be discussed in more detail below on the basis of embodiments of the pressure system illustrated in the figures.

In one refinement, all of the valves of the compressed-air feed system are electromagnetically controllable, such that they can be actuated, and varied in terms of their respective position, by means of an electrical control system.

The open-loop and closed-loop control takes into consideration the regeneration of the drying agent, with specification of regeneration cycles to be implemented.

Preferred refinements of the pneumatic system according to the second aspect of the invention are described below.

In a preferred refinement of the pneumatic system, every tire of the pneumatic suspension system is assigned a gallery and a branch line which is pneumatically connected to the gallery and which has a bellows and/or a compressed-air reservoir and which has a directional valve connected upstream of the bellows and/or of the compressed-air reservoir. Each tire can be individually aerated and ventilated by means of the first directional valve assigned to the respective tire. In particular, by means of the compressed-air feed system, each tire can be individually very quickly ventilated and aerated. In this refinement, by means of different ventilation of the pneumatics of different tires, the vehicle that has the compressed-air feed system can also be lowered on one side, in particular on the left side or right side. Accordingly, in one variant of this refinement, a vehicle is always lowered on the side on which a door for boarding is opened. This may be realized for example by means of a sensor system which is functionally connected to the pneumatic system, wherein the sensor system has sensors which transmit a sensor signal when a door of the vehicle is opened.

Preferred refinements of the method according to the third aspect of the invention for operating a pneumatic system are described below.

In one refinement, the filling takes place, in a first filling operating mode, via the main line valve and via the bypass valve simultaneously, wherein the bypass valve and a filling valve, via which a compressed-air reservoir is connected to the pneumatic main line, are open simultaneously, such that the pneumatic system is, over the predetermined time period, preferably over an entire time period, of a filling process, filled via the regeneration throttle and via the bypass line.

In a further refinement, the filling of the pneumatic system with compressed air takes place by means of a second filling operating mode, in which the bypass valve is closed, such that the pneumatic system is, over the predetermined time period, preferably over the entire time period, of a filling process, filled only via the regeneration throttle.

In a refinement, the ventilation takes place, in a first ventilation operating mode, only via the ventilation valve, such that the pneumatic system is, exclusively over the predetermined time period, preferably over the entire time period, of a ventilation process, ventilated via the regeneration throttle and not via the bypass valve.

In a preferred refinement, the ventilation in a second ventilation operating mode takes place via the regeneration throttle and the bypass valve simultaneously, wherein the ventilation valve and the bypass valve are open simultaneously, such that the pneumatic system is, over the predetermined time period of a ventilation process, ventilated via the ventilation throttle and via the bypass line.

In a refinement of the method according to the third aspect of the invention, a humidity of air within the pneumatic system is reduced by repeated ventilation and filling of the pneumatic system with the bypass valve closed. In this refinement, the pneumatic system and the compressed-air feed system can be protected against corrosion and resulting malfunctions. In particular, repeated ventilation and filling cycles can be performed advantageously when the pneumatic system is temporarily not being actively utilized.

FIG. 1A shows a first embodiment of a compressed-air feed system 10 according to a first aspect of the invention, having a two-stage compressor 51, a 4/2 directional check valve as ventilation valve 73, and a 2/2 directional valve as bypass valve 73'.

In the first embodiment, the compressed-air feed system 10 is designed to be utilized for operating a pneumatic system, in particular an air suspension system of a vehicle. For this purpose, the compressed-air feed system has a compressed-air supply 1, a compressed-air connection 2 to the pneumatic system (not illustrated in FIGS. 1A and 1B), a ventilation connection 3 to the surroundings 7, and a pneumatic main line 60. For this purpose, the pneumatic main line 60 is arranged between the compressed-air supply 1 and the compressed-air connection 2 and has an air dryer 61, a regeneration throttle 62 and a check valve 63. Formed between the pneumatic main line 60 and the ventilation connection 3 is a ventilation line 70, which has a ventilation throttle 72 and the ventilation valve 73. In this embodiment, the ventilation valve 73 is formed as a pneumatic valve. Furthermore, between the compressed-air connection 2 and the air dryer 61, there is arranged a bypass line 70', which has an additional bypass valve 73' which is formed as a 2/2 directional valve. In the illustrated embodiment, the bypass valve 73' is formed as an electrical valve. In further embodiments which are not illustrated, the bypass valve is formed for example as a pneumatic valve. Here, the bypass line 70' is connected via a first and a second connection point 4, 5 to the pneumatic main line 60. The first connection point 4 is arranged between the air dryer 61 and the regeneration throttle 62, whereas the second connection point 5 is, in this embodiment, arranged between the regeneration throttle (62) and the compressed-air connection (2). An actuation (not illustrated in FIGS. 1A and 1B) of the bypass valve 73' is performed such that a filling and ventilation of the pneumatic system 90 is possible bypassing the regeneration throttle 62 via the bypass valve 73', wherein the air flow implemented for filling and/or ventilation is conducted via the air drier 61.

By means of an air compressor formed as a two-stage compressor 51, filling by means of the compressed-air feed system 10 is accelerated in relation to the use of a single compressor. The two-stage compressor 51 is, for this purpose, connected both to the compressed-air supply 1 and to the pneumatic main line 60. In this way, in the presence of a corresponding operating mode, said two-stage compressor can fill the pneumatic system, which is connected to the compressed-air feed system 10, with compressed air in a particularly effective manner. Here, it is advantageous in particular that the bypass line 70' provides a further flow cross section, in addition to the flow cross section formed by the regeneration throttle 62, for the air flow utilized for filling purposes. Fast filling is therefore possible for the compressed-air feed system 10.

By virtue of the fact that the ventilation connection 3 is used for the ventilation of the ventilation line 70, and is furthermore also connected to an air supply 0 for the filling of the pneumatic system with compressed air, the compressed-air feed system 10 of this first embodiment makes do with particularly few components, and only one air filter 0.1 has to be used, which is installed directly at the ventilation connection 3.

The ventilation valve 73 is a 4/2 directional valve and, in a first position, leaves the ventilation line 70 closed and forms the check valve 63 in the pneumatic main line 60. Said check valve 63 opens, in accordance with a spring force within the check valve 63, in the presence of a suitably high filling pressure from the two-stage compressor 51, and thereby permits filling of the pneumatic system connected to the compressed-air feed system 10. In a second position of the ventilation valve 73, the ventilation line 70 is open for an air flow in the direction of the ventilation connection 3, that is to say during a ventilation, and the check valve 63 in the pneumatic main line 60 is replaced by a valve which permits an air flow in the direction of the air dryer 61, which is likewise the case for a ventilation.

An actuation of the ventilation valve 73' for setting the position may be realized by means of an electromagnetic signal which is transmitted by a controller (not illustrated) of the compressed-air feed system 10.

In the pneumatic main line 60, the regeneration throttle 62 is situated in a ventilation path of the compressed air for a ventilation through the ventilation line 70, wherein the regeneration throttle 62 has a nominal width between 0.5 mm and 4.0 mm, preferably of 1.5 mm. Situated in the ventilation duct 70 is the ventilation throttle 72, which has a nominal width of between 2.6 mm and 8.0 mm, preferably of 3.6 mm, such that the regeneration throttle 62 effects a limitation of the ventilation flow through the ventilation line 70 by means of a minimum flow cross section 74 for an air flow through the first ventilation line 70.

The additional bypass valve 73' in the bypass line 70' is a 2/2 directional valve, which is closed in a first position illustrated in FIG. 1A. Therefore, it is possible only by means of an active change of the valve position for the bypass valve 73' formed as a 2/2 directional valve to be passed through by an air flow conducted via the bypass line 70'.

Figure 1B:
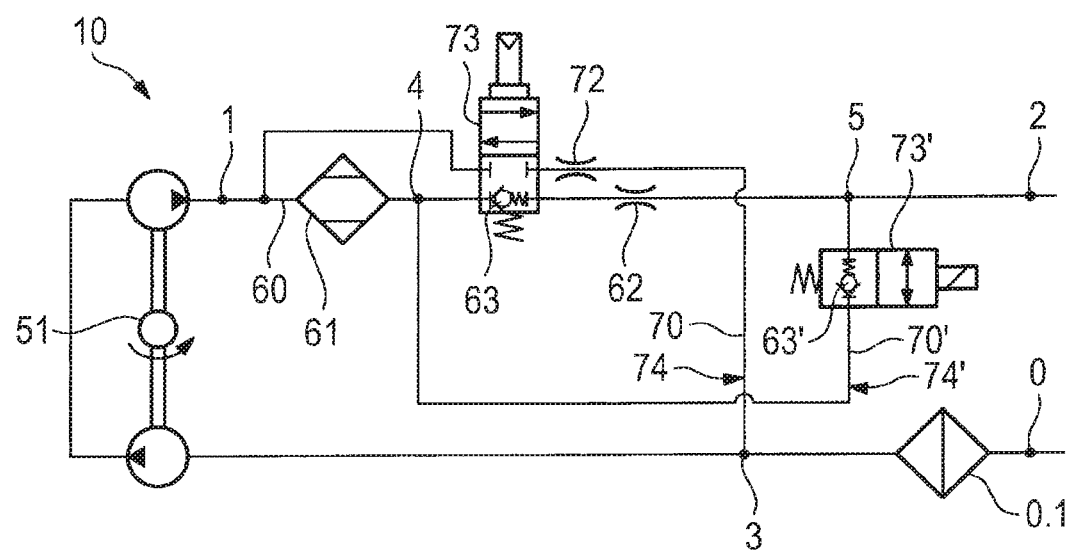

In an optional embodiment of the compressed-air feed unit 10 as illustrated in FIG. 1B, the bypass valve 73' is formed as a check valve 63'. In a manner dependent on a spring force of a spring which closes the check valve 63', a filling pressure of adequate magnitude can lead to an opening of the check valve. In this way, without an active change of the position of the bypass valve 73', the bypass line 70' can, in the presence of an excessively high filling dynamic pressure upstream of the regeneration throttle 62, for example during operation of the compressor 51, be utilized for an air flow in order to reduce the dynamic pressure upstream of the throttle 62. In the embodiment illustrated, a spring force of the closing spring of the check valve 63' is greater than the spring force of the check valve 63 arranged in the pneumatic main line 60. It is hereby ensured that the check valve 63' opens at higher pressures than the check valve 63.

In the second position, which is identical for the embodiments from FIG. 1A and FIG. 1B, of the bypass valve 73', the bypass line 70' is open for air flows in the filling and ventilation directions. Here, the bypass valve 73' has, in the second position, a nominal width 74' of between 1 mm and 4 mm, preferably of 2.4 mm. Consequently, the bypass valve 73' can be used for a ventilation and for an aeration of the pneumatic system which is connected to the compressed-air feed system 10 via the compressed-air connection 2.

An actuation of the bypass valve 73' for setting the position is realized by means of an electromagnetic signal which is transmitted by a controller (not illustrated) of the compressed-air feed system 10.

A comparison of the above-stated nominal widths shows that, in the compressed-air feed system 10, a filling or ventilation of the pneumatic system takes place much more slowly through exclusively the regeneration throttle 62 than through a combination of regeneration throttle 62 and bypass line 70'. Consequently, in a manner dependent on a desired operating mode, very fast filling or ventilation of the pneumatic system can take place via the bypass line 70' and the regeneration throttle 62, or a slower and thus more controlled filling or ventilation can be realized with the bypass valve 73' closed. Here, a slow ventilation with the bypass valve 73' closed permits better dryer regeneration than is possible in the case of a fast ventilation. A ventilation which takes place only an air flow via the bypass line 70' and not via the regeneration throttle 62 is, in the present embodiment, ruled out by the ventilation valve 73 formed as a 4/2 directional valve, because an air flow through the ventilation line 70 is possible only in the second position, in which an air flow can also take place through the pneumatic main line 60.

One possible use of the first embodiment of the compressed-air feed system 10 is such that the relatively slow ventilation via the regeneration throttle 62 takes place as a vehicle equipped with the pneumatic system is traveling. By contrast, the relatively fast ventilation via the regeneration throttle 62 and the bypass line 70' effects a relatively fast lowering of a vehicle equipped with the pneumatic system, for example in order to permit more convenient boarding of the vehicle. Furthermore, the first embodiment of the compressed-air feed system 10 is configured such that a slow filling via the regeneration throttle 62 takes place as a vehicle equipped with the corresponding pneumatic system is traveling. By contrast, the relatively fast filling via the regeneration throttle 62 and the bypass line 70' makes it possible for a desired air pressure level within the pneumatic system to be reached more quickly, such as may be desirable for example after a fast lowering for the purposes of convenient boarding of the vehicle equipped with the corresponding pneumatic system.

Figure 2:
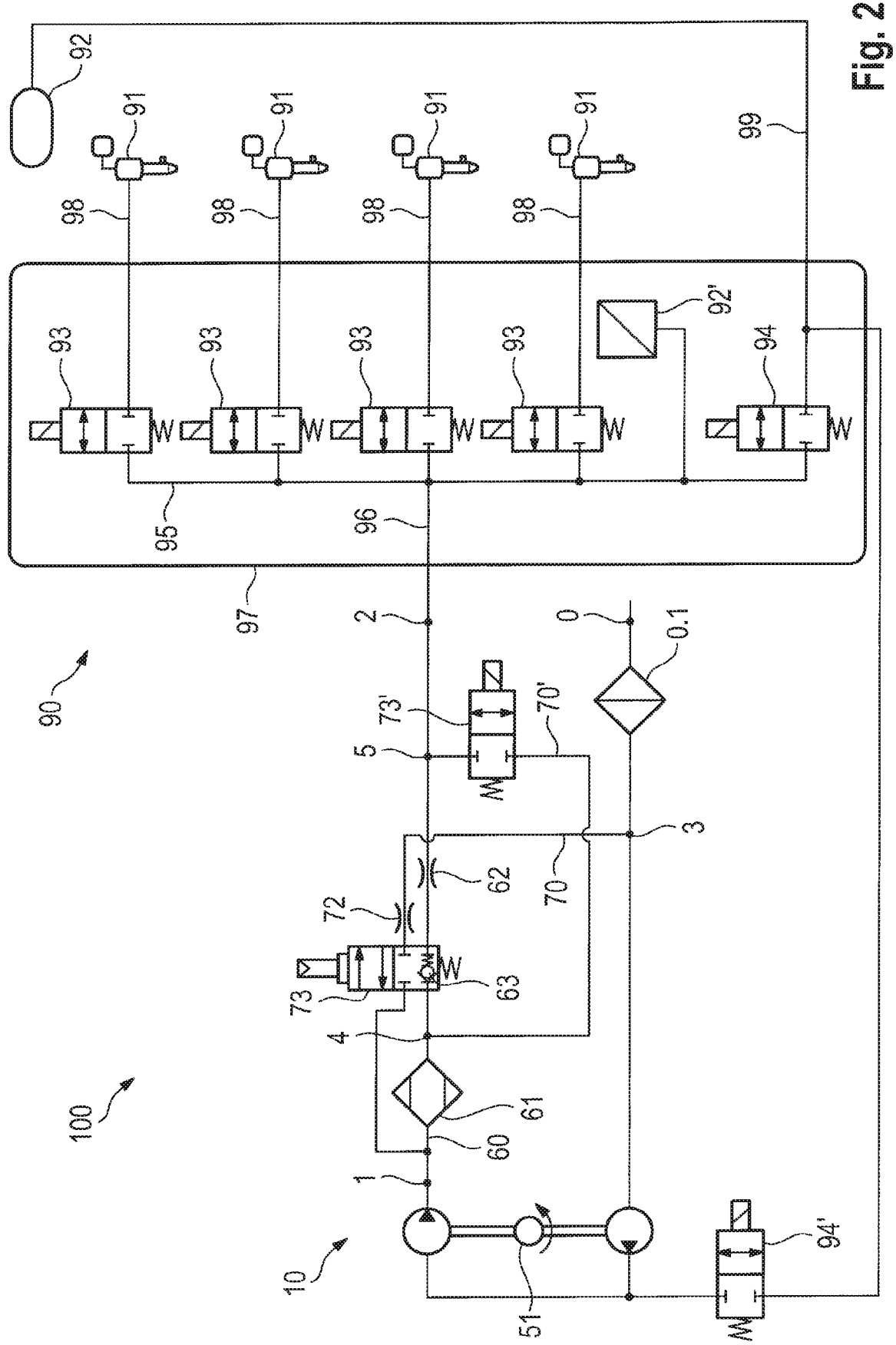
FIG. 2 shows a pneumatic system according to an embodiment of a second aspect of the invention, having a compressed-air system and a pneumatic system with a compressed-air reservoir and with a directional valve connected upstream at each bellows.

FIG. 2 shows an embodiment of a pneumatic system 100 according to a second aspect of the invention, having a compressed-air feed system 10 according to the first embodiment and having a pneumatic system 90 with a compressed-air reservoir 92 and with a first directional valve 93 connected upstream at each bellows 91.

The compressed-air feed system 10 is of identical design to the first embodiment shown in FIG. 1A. Also schematically illustrated is the pneumatic system 90 connected to the compressed-air connection 2. The pneumatic system 90 is in the form of an air suspension system.

In this case, the air suspension system has a number of four so-called bellows 91, which are assigned in each case to one wheel of the vehicle (not illustrated in any more detail) and form an air spring of the vehicle. Furthermore, the air suspension system has a compressed-air reservoir 92 for storing rapidly available compressed air for the bellows 91. Connected upstream of the bellows 91 is in each case one first directional valve 93, which is formed as a magnetic valve in a first branch line 98 formed as a spring branch line and which serves in each case as a ride-height control valve for opening or closing an air spring formed with a bellows 91. The magnetic valves 93 in the spring branch lines 98 are formed as 2/2 directional valves. Connected upstream of the compressed-air reservoir 92, in a second branch line 99 formed as a reservoir branch line, there is a second directional valve 94, which is formed as a magnetic valve and which is in the form of a further 2/2 directional valve, as reservoir valve. The magnetic valves 93, 94 are connected to a common manifold line, a pneumatic line which forms gallery 95. The gallery 95 is pneumatically connected via a further pneumatic line 96, for forming a pneumatic interconnection, to a compressed-air connection 2 of the compressed-air feed system 10. In the present case, the magnetic valves 93, 94 are arranged in a valve block 97 with five valves. The magnetic valves 93, 94 are shown in FIG. 2 in an electrically deenergized state—here, the magnetic valves 93, 94 are formed as magnetic valves which are closed when electrically deenergized.

Also provided in the pneumatic system 90 is a stress/pressure sensor 92', which can measure a pressure in the gallery 95 of the pneumatic system 90. The pressure is transmitted to a controller (not illustrated in FIG. 2) of the pneumatic system, which controller controls, or can control, the valves 73, 73', 93, 94 of the pneumatic system inter alia in a manner dependent on the measured pressure.

Other embodiments (not shown here) may realize a different arrangement of the magnetic valves 93, 94—it is also possible for fewer magnetic valves to be utilized within the valve block.

In particular, the isolating valve arranged as a check valve 63 in the pneumatic main line 60 does not need to be arranged in the compressed-air feed system 10 in the case of an embodiment which is not shown here. Rather, an isolating valve may also be arranged in the pneumatic system 90, for example also within the valve block 97. In a further embodiment which is not shown here, no check valve but rather a magnetic valve or a pneumatic relay valve or some other suitable valve is arranged in the pneumatic main line.

In addition to the reservoir valve 94 formed as magnetic valve, the compressed-air reservoir 92 is also connected via a filling valve 94' to the pneumatic main line 60 of the compressed-air feed system. A flow of compressed air from the compressed-air reservoir 92 that is thus made possible can be additionally compressed by the two-stage compressor 51 before passing via the compressed-air supply 1 into the pneumatic main line 60, which results in a particularly effective and fast filling of the pneumatic system 90 with compressed air. It is thus possible in the illustrated embodiment of the pneumatic system to select between filling of the pneumatic system via the reservoir valve 94 and filling via the filling valve 94'. Here, the filling via the filling valve 94' provides the advantage that, by virtue of the air flow being conducted through the dryer 61, a level of humidity of the air flow is reduced, which provides protection against damage as a result of corrosion within the pneumatic system 90. Furthermore, as already discussed in the context of FIG. 1A, in the case of filling via the filling valve 94', a selection can be made between slow filling exclusively via the regeneration throttle 62, with correspondingly good drying, and fast filling via the dryer throttle 62 and bypass line 70'.

Figure 3:
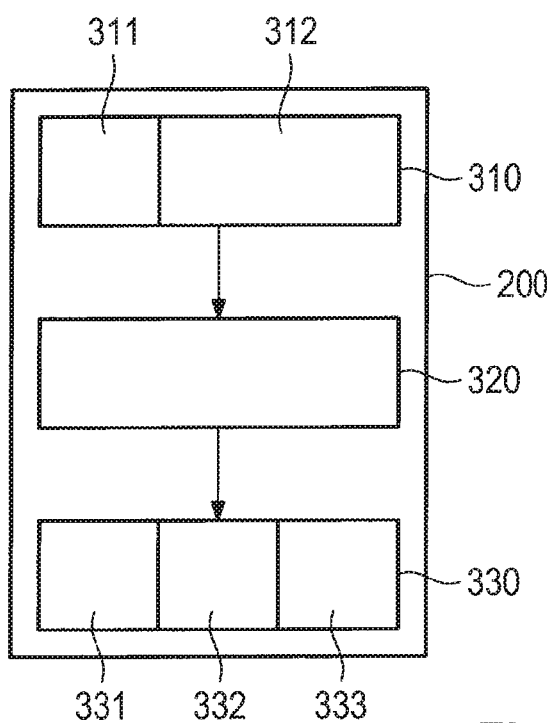
FIG. 3 shows a device according to an embodiment of a fourth aspect of the invention, which device is designed to control, in open-loop and/or closed-loop fashion, a pneumatic system, in particular an air suspension system of a vehicle, in accordance with a method according to a third aspect of the invention.

FIG. 3 shows an embodiment of a device (200) according to a fourth aspect of the invention. The device (200) is designed to control, in open-loop and/or closed-loop fashion, an in accordance with a method for operating a pneumatic system, in particular an air suspension system of a vehicle, in accordance with a third aspect of the invention. The method comprises the steps stated below.

In a first step 310 of the method, the pneumatic system is filled by means of a compressed-air flow, conducted via a pneumatic main line and via the air dryer, from the compressed-air feed system via a main line valve arranged in the pneumatic main line and/or via a bypass valve. Here, the device (200) is designed to provide both a boost mode (311) and also at least one further, first filling operating mode (312) for filling the pneumatic system.

In the next step 320, the pressure in the pneumatic system is maintained, wherein the pneumatic main line is shut off, for prevention of a compressed-air flow out of the pneumatic system, by means of the ventilation valve and the bypass valve.

A final step 330 of the method comprises ventilating the pneumatic system by means of the compressed-air flow, conducted via the pneumatic main line and via the air dryer, from the pneumatic system via a ventilation valve connected to a ventilation throttle or via the ventilation valve and a bypass valve. The device (200) is designed to provide a first (331), a second (332) and a third ventilation operating mode (333) for this purpose.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS 0.1 Air filter
0 Air supply
1 Compressed-air supply
2 Compressed-air connection
3 Ventilation connection
4 First connection point
5 Second connection point
7 Surroundings
10 Compressed-air feed system
51 Two-stage compressor
60 Pneumatic main line
61 Air dryer
62 Regeneration throttle
63 Check valve
63' Check valve of the bypass line
70 Ventilation line
70' Bypass line
72 Ventilation throttle
73 Ventilation valve
73' Bypass valve
74 Flow cross section of the ventilation line
74' Flow cross section of the bypass line
90 Pneumatic system
91 Bellows
92 Compressed-air reservoir
92' Stress/pressure sensor
93 First directional valve
94 Second directional valve; reservoir valve
94' Filling valve
95 Gallery
96 Further pneumatic line
97 Valve block
98 First branch line, spring branch line
99 Second branch line, reservoir branch line
100 Pneumatic system
200 Device
310 First step of the method
311 Boost mode
312 First filling operating mode
320 Next step of the method
330 Final step of the method
331 First ventilation operating mode
332 Second ventilation operating mode
333 Third ventilation operating mode

The invention claimed is:

1. A compressed-air feed system for operating a pneumatic system, the compressed-air feed system comprising:
a compressed-air supply;
a compressed-air connection to the pneumatic system;
a ventilation connection to surroundings;
a pneumatic main line between the compressed-air supply and the compressed-air connection, the pneumatic main line having an air dryer and a regeneration throttle;
a ventilation line between the pneumatic main line and the ventilation connection, the ventilation line having a ventilation valve and a ventilation throttle;
a bypass line between the compressed-air connection and the air dryer, the bypass line having a bypass valve formed as a 2/2 directional valve configured to permit an air flow conducted via the air dryer, and bypassing the regeneration throttle, for filling and ventilating the pneumatic system.

2. The compressed-air feed system as claimed in claim 1, wherein the bypass line is connected via a first and a second connection points to the pneumatic main line, wherein the first connection point is arranged between the air dryer and the regeneration throttle, and wherein the second connection point is arranged between the regeneration throttle and the compressed-air connection.

3. The compressed-air feed system as claimed in claim 1, wherein the ventilation valve has a check valve, and/or wherein the bypass valve has a check valve.

4. The compressed-air feed system as claimed in claim 1, wherein the bypass line permits a larger minimum flow cross section of a throughflowing compressed-air flow than the regeneration throttle.

5. The compressed-air feed system as claimed in claim 1, in which the ventilation line permits a larger minimum flow cross section of a throughflowing compressed-air flow than a cross section of the bypass line.

6. The compressed-air feed system as claimed in claim 1, further comprising a compressed-air reservoir as part of a pneumatic system which is connected via a filling valve to the pneumatic main line and which is configured to, in a boost mode of the compressed-air feed system, fill the pneumatic system with compressed air via the filling valve and the pneumatic main line.

7. The compressed-air feed system as claimed in claim 1, further comprising a two-stage compressor connected both to the air supply and to the pneumatic main line and which is configured to, in a corresponding filling operating mode of the compressed-air feed system, fill the pneumatic system with compressed air.

8. The compressed-air feed system as claimed in claim 1, wherein the pneumatic main line has a check valve.

9. The compressed-air feed system as claimed in claim 6, configured to provide a first filling operating mode in which the bypass valve and the filling valve are at least temporarily simultaneously open, such that the pneumatic system can, over a predetermined time period of a filling process, be filled by an air flow from the compressed-air reservoir, which flow is, in part, limited not by the regeneration throttle but by a minimum flow cross section of the bypass line.

10. The compressed-air feed system as claimed in claim 9, configured to provide a second ventilation operating mode in which the ventilation valve and the bypass valve are simultaneously open, such that the pneumatic system can, over an entire time period of a ventilation process, be ventilated via the ventilation line by an air flow which is, in part, limited not by the regeneration throttle but by a minimum flow cross section of the bypass line.

11. The compressed-air feed system as claimed in claim 10, wherein the second and/or another ventilation operating mode are provided such that the first ventilation valve is opened at a time t1 and that the bypass valve is opened at a time t2, and wherein the time t1 precedes the time t2.

12. The compressed-air feed system as claimed in claim 10, wherein the second and/or another ventilation operating mode are provided such that the first ventilation valve is closed at a time t3 and that the bypass valve is closed at a time t4, and wherein the time t3 follows the time t4.

13. A pneumatic system including the compressed-air feed system as claimed in claim 1, and further including a pneumatic system formed as an air suspension system having a gallery and at least one first branch line, which is pneumatically connected to the gallery and which has a bellows, and/or a second branch line, which is pneumatically connected to the gallery and which has a compressed-air reservoir, and having a first directional valve connected upstream of the bellows and/or a second directional valve connected upstream of the compressed-air reservoir.

14. A method for operating a compressed-air feed system, and/or a pneumatic system, the method comprising:
   filling a pneumatic system by a compressed-air flow, conducted via a pneumatic main line and via an air dryer, from the compressed-air feed system via a main line valve arranged in the pneumatic main line and/or via a bypass valve, the pneumatic main line having the air dryer and a regeneration throttle;
   maintaining a pressure in the pneumatic system, wherein the pneumatic main line is shut off, by a first ventilation valve and the bypass valve, for prevention of a flow of compressed air out of the pneumatic system, the ventilation valve disposed in a ventilation line between the pneumatic main line and a ventilation connection, and
   ventilating the pneumatic system by the compressed-air flow, conducted via the pneumatic main line and via the air dryer, from the pneumatic system via a ventilation valve connected to a ventilation throttle or via the first ventilation valve and a bypass valve.

15. The method as claimed in claim 14, wherein the filling takes place, in a first filling operating mode, via a main line valve in the pneumatic main line and via the bypass valve simultaneously, wherein the bypass valve and a filling valve, via which a compressed-air reservoir is connected to the pneumatic main line, are open simultaneously, such that the pneumatic system is, over a predetermined time period of a filling process, filled via the regeneration throttle and via the bypass line.

16. The method as claimed in claim 14, in which the ventilation in a second ventilation operating mode takes place via the regeneration throttle and the bypass valve simultaneously, wherein the ventilation valve and the bypass valve are open simultaneously, such that the pneumatic system is, over an entire time period of a ventilation process, ventilated via the ventilation throttle and via the bypass line.

17. The method as claimed in claim 14, in which a humidity of air within the pneumatic system is reduced by repeated ventilation and filling of the pneumatic system with the bypass valve closed.

18. A device configured to perform the method as claimed in claim 14 for open-loop and/or closed-loop control of a compressed-air feed system and/or of a pneumatic system.

* * * * *